United States Patent
Jansen et al.

(10) Patent No.: US 6,916,855 B2
(45) Date of Patent: Jul. 12, 2005

(54) RADIATION CURABLE COMPOSITIONS

(75) Inventors: Johan F. G. A. Jansen, Geleen (NL); Aylvin J. A. A. Dias, Maastricht (NL); Marko Dorschu, Beek (NL); Betty B Coussens, Houthalen (BE)

(73) Assignee: DSM IP Assets B.V., Heerlen (NL)

( * ) Notice: Subject to any disclaimer, the term of this patent is extended or adjusted under 35 U.S.C. 154(b) by 203 days.

(21) Appl. No.: 09/989,717

(22) Filed: Nov. 21, 2001

(65) Prior Publication Data

US 2003/0149127 A1 Aug. 7, 2003

Related U.S. Application Data

(63) Continuation-in-part of application No. 09/717,377, filed on Nov. 22, 2000, and a division of application No. 09/979,377, filed on Nov. 22, 2000.

(30) Foreign Application Priority Data

Nov. 22, 2000 (EP) .............................. 00204144
Dec. 22, 2000 (EP) .............................. 00204729
Jan. 17, 2001 (EP) .............................. 01200174

(51) Int. Cl.$^7$ ................................ C08F 2/46
(52) U.S. Cl. ................ 522/167; 522/168; 522/169; 522/170; 522/113; 522/114; 522/115; 522/116; 522/118; 522/120; 522/122; 522/126; 522/127; 522/129; 522/134; 522/96; 522/90; 522/97; 522/135; 522/136; 522/138; 522/141; 522/143; 522/144; 522/146
(58) Field of Search ................ 522/168, 167, 522/169, 170, 113, 114, 115, 116, 118, 120, 122, 126, 127, 129, 134, 135, 136, 138, 141, 143, 144, 146, 96, 90, 97

(56) References Cited

U.S. PATENT DOCUMENTS

| | | |
|---|---|---|
| 5,047,261 A | 9/1991 | Moussa et al. |
| 5,360,836 A | 11/1994 | Chevallier et al. |
| 5,629,359 A | 5/1997 | Peeters et al. |
| 5,744,514 A | 4/1998 | Shustack |
| 5,837,750 A | 11/1998 | Szum et al. |
| 6,110,593 A | 8/2000 | Szum et al. |

FOREIGN PATENT DOCUMENTS

| | | |
|---|---|---|
| EP | 667560 | 8/1995 |
| WO | 92 04383 | 3/1992 |
| WO | 97/42130 | 11/1997 |
| WO | 99/08975 | 2/1999 |
| WO | 99/15473 | 4/1999 |
| WO | 99/48939 | 9/1999 |
| WO | 99/52958 | 10/1999 |
| WO | 00/18696 | 4/2000 |

OTHER PUBLICATIONS

Decker et al. A New Class of Highly Reactive Acrylic Monomers, 1 Light–induced polymerization. Makromolecular Chem. Rapid Communications, 11, pps 159–167 (1990).*

* cited by examiner

*Primary Examiner*—James J. Seidleck
*Assistant Examiner*—Sanza L. McClendon
(74) *Attorney, Agent, or Firm*—Mayer Brown Rowe & Maw LLP

(57) ABSTRACT

The invention relates to a radiation curable composition comprising radiation curable components wherein at least one component of the radiation curable composition contains a functional group which, when attached to an acrylate group has a calculated Boltzmann average dipole moment of higher than 3.5 Debye. The invention further relates to radiation curable optical fiber coating compositions having a high dielectric constant.

22 Claims, No Drawings

RADIATION CURABLE COMPOSITIONS

CROSS REFERENCE TO RELATED APPLICATIONS

This application is continuation-in-part of U.S. application Ser. No. 09/717,377 filed Nov. 22, 2000, the entire contents of the parent application are hereby incorporated in their entirety by reference.

This application is divisional of U.S. application Ser. No. 09/979,377 filed Nov. 22, 2000, the entire contents of the parent application are hereby incorporated in their entirety by reference.

FIELD OF THE INVENTION

The invention relates to radiation curable compositions comprising a radiation curable oligomer, a radiation curable diluent, and optionally a radical generating photoinitiator. Such radiation curable compositions are well known in the art.

DESCRIPTION OF RELATED ART

Radiation curable compositions are commonly used as protective coatings or as adhesives. Important characteristics of these compositions are the rate of cure, and the physical characteristics of the cured composition such as e.g. pendulum hardness. The cure rate for a certain composition can be increased by increasing the amount of photoinitiator. This however has certain drawbacks. Generally, photoinitiators are expensive and these compounds yield extractable residues in the cured coating. Hence, increasing the amount of photoinitiator often is undesirable.

U.S. Pat. No. 5,047,261 discloses the use of a mono(meth)acrylate reactive diluent having a cyclic 5-membered ring carbonate functionality which shows high reactivity in radiation crosslinkable compositions. In U.S. Pat. No. 5,047,261 a single reactive diluent is disclosed, which surprisingly gives a much higher reactivity and photosensitivity, and thus a higher rate of polymerization than other known reactive diluents.

U.S. Pat. No. 5,360,836 discloses the use of a mono(meth)acrylate reactive diluent having an oxazolidone ring. This reactive diluent also enhances the reactivity, in particular the rate of polymerization of a radiation curable composition.

These applications disclose reactive diluents that have very different and non-relating structures and that have been found accidentally. There is no teaching disclosed that will enable the skilled man to develop other reactive components that will also enhance the reactivity of photocrosslinkable compositions.

OBJECT OF THE INVENTION

It is an object of the present invention to find radiation curable compositions that have enhanced reactivity and photosensitivity.

It is also an object of the present invention to find radiation curable compositions that have a controlled reactivity and photosensitivity.

SUMMARY OF THE INVENTION

One or more of the above objects are obtained by a radiation curable composition comprising radiation curable components whereby at least one component of the radiation curable composition contains a functional group which functional group when attached to an acrylate group, has a calculated Boltzmann average dipole moment of higher than 3.5 Debye, excluding the components 2,3-carbonyldioxypropyl 2-(meth)acryloyloxyethyl carbonate, 3,4-carbonyldioxybutyl 2-(meth)acryloyloxyethyl carbonate, 5,6-carbonyldioxyhexyl 2-(meth)acryloyloxyethyl, the acrylate of beta-hydroxyethyloxazolidone, and 2-oxo-1,3-dioxolan-4-yl-methyl acrylate.

The expression "functional group when attached to an acrylate group" covers components wherein the functional group is directly connected to the acrylate group as well as components wherein the functional group is connected to the acrylate group through an alkyl chain.

The "component containing a functional group which functional group when attached to an acrylate group is having a calculated Boltzmann average dipole moment of higher than 3.5 Debye" is further referred to as "the component containing a functional group having a high dipole moment" and said component can contain a radiation curable functional group or not. When said component contains a radiation curable functional group, said group can be chosen from the group consisting of methacrylate, acrylate, vinylether, fumarate, maleate, itaconate, oxolane or epoxy group.

DETAILED DESCRIPTION OF THE INVENTION

The improvement found by the present inventors is applicable in many radiation curable compositions, but is particularly suitable in fiber optic technology, adhesives and coatings for optical readable disks, hard coatings and stereolithography, as these fields of technology require high cure speed and/or high light sensitivity, and/or high hardness.

The inventors found a relationship between the polarity of a radiation curable composition and the rate of cure or polymerization upon exposure of light. An increase in the polarity or dielectric constant of a radiation curable composition causes an increase of the rate of polymerization. The dielectric value of the radiation curable composition is preferably enhanced by adding compounds that have high dipole moments. By addition of such compounds compositions can be made that have dielectric constants of greater than 6. The dielectric constant has been measured as indicated under the test method section.

For primary coatings according to the present invention that are used in optical fiber technology the dielectric constant is preferably greater than 6.25. Coating compositions with these high dielectric values show very fast curing characteristics which ensures excellent mechanical properties and fast coating speeds of the glass fibers which is an important demand in this technology.

For secondary coatings according to the present invention that are used in optical fiber technology the dielectric constant is preferably greater than 7.0.

For matrix materials according to the present invention that are used in optical fiber technology the dielectric constant is preferably greater than 8.75.

For clear compositions according to the present invention that are used in optical fiber technology as a base composition for a colored coating or an ink composition the dielectric constant is preferably greater than 8.25.

The radiation curable compositions of the present invention preferably contain oligomer (A) and/or diluent (B) of which (A), (B) or both contain one or more functional groups having high dipole moments.

Preferably the dipole moment of the functional group, when attached to an acrylate group, is greater than 4.0 Debye, more preferable greater than 4.5 Debye, even more preferably greater than 5.0 Debye, particularly preferred greater than 5.5 Debye, and most preferably greater than 6.0 Debye.

Preferably, the component containing a functional group having a high dipole moment is present in the radiation curable composition of the present invention in an amount of at least about 3 wt. % relative to the total amount of components in the composition, more preferably at least about 5 wt. %, even more preferably at least about 10 wt. %, particularly preferred at least about 15 wt. %, and most preferred at least about 20 wt. %. Said component is preferably present in an amount of about 98 wt. % or less relative to the total amount of components in the composition, more preferably 90 wt. % or less, particularly preferred 80 wt. % or less and most preferred 60 wt % or less.

Preferably, the component containing a functional group having a high dipole moment is present in an amount sufficient to increase the cure speed as measured by RT FTIR with at least 3% double bond conversion per second, more preferably at least 5%/sec, even more preferably at least 10%/sec, particularly preferably at least 20%/sec and most preferred at least 50%/sec.

The higher the dipole moment of the high dipole component, the lower the amount necessary to achieve a coating composition that has the desired dielectric constant.

Preferably, the radiation curable composition of the present invention comprises a mixture of a monofunctional reactive diluent having a calculated Boltzmann average dipole moment of lower than 3.5 Debye with a monofunctional reactive diluent having a calculated Boltzmann average dipole moment of higher than 3.5 Debye, more preferably in a ratio at least 60/40, even more preferred at least 50/50, particularly preferred at least 40/60 and most preferred at least 30/80. A particularly preferred composition comprises as monofunctional reactive diluents only monofunctional acrylates having a calculated Boltzmann average dipole moment of higher than 3.5 Debye.

The radiation curable composition of the present invention preferably comprises a radiation curable oligomer (A) and a diluent (B). Preferably the diluent (B) is a reactive diluent (B).

Functional groups having high dipole moments can be made in general by directing and fixing the individual dipole moments of the atoms of the group in substantially the same direction. Fixation of the structure can be done for example by applying sterically demanding groups as substituents or by making ring structures. Preferably the functional groups have ring structures. Preferably, said ring structures contain at least one atom that is not a carbon atom. More preferably, at least one atom, even more preferably, at least two atoms of said ring structures is selected from the group consisting of O, P, N, S, and the like.

Examples of functional groups that have high dipole moments and fall under the scope of the present invention are components having a functional group chosen from the group consisting of 5-membered ring phosphate, 6-membered ring phosphate, 5-membered ring phosphite, 6-membered ring phosphite, 4-membered ring lacton, 5-membered ring lacton, 6-membered ring lacton, 5-membered ring carbonate, 6-membered ring carbonate, 5-membered ring sulphate, 6-membered ring sulphate, 5 ring sulphoxide, 6-membered ring sulphoxide, 6-membered ring amide, 5-membered ring urethane, 6-membered ring urethane, 7-membered ring urethane, 5-membered ring urea, 6-membered ring urea, and 7-membered ring urea. Especially preferred are components that have a urethane group in the molecule and a 5-membered ring phosphate, 6-membered ring phospate, 5-membered ring phosphite, 6-membered ring phosphite 4 ring lacton, 5-membered ring lacton, 6-membered ring lacton, 5-membered ring carbonate, 6-membered ring carbonate, 5-membered ring sulphate, 6-membered ring sulphate, 5 ring sulphoxide, 6-membered ring sulphoxide, 5-membered ring amide, 6-membered ring amide, 7 ring amide, 5-membered ring urethane, 6-membered ring urethane, 7-membered ring urethane, 5-membered ring urea, 6-membered ring urea, 7-membered ring urea group.

Also very reactive and preferred components are components having both a carbonate functionality in the molecule and a functionality selected from the list consisting of a 5 ring phosphate, 6-membered ring phosphate, 5-membered ring phosphite, 6-membered ring phosphite, 4-membered ring lacton, 5-membered ring lacton, 6-membered ring lacton, 5-membered ring carbonate, 6-membered ring carbonate, 5-membered ring sulphate or sulphite, 6-membered ring sulphate or sulphite, 5-membered ring sulphite, 6-membered ring sulphite, 5 ring sulphoxide, 6-membered ring sulphoxide, 5-membered ring amide, 5-membered ring imide, 6-membered ring amide, 7 ring amide, 5-membered ring imide, 6-membered ring imide, 5-membered ring thioimide, 6-membered ring thioimide, 5-membered ring urethane, 6-membered ring urethane, 7-membered ring urethane, 5-membered ring urea, 6-membered ring urea and 7-membered ring urea group.

Preferred examples of components that have a functional group that have a calculated Boltzmann average dipole moment of 3.5 Debye or greater when attached to an acrylate group are the components selected from the group consisting of lactones (C1) according to the formula (1):

(1)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P; X is an oxygen or sulfur atom; Y is an oxygen or sulfur atom or an $NR_7$-group;; n is 0–4; m is 0–4 and n+m=1–4; preferably n+m=2 or 3 and X, Y are oxygen; or cyclic carbonates (C2) according to formula (2):

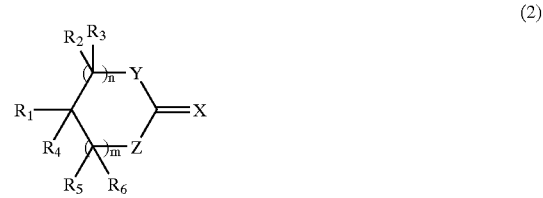

(2)

wherein $R_1$ =organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 0–4; m is 0–4 and n+m=1–4, but excluding the compound where n=1, m=0, $R_2$, $R_3$, $R_4$=H and $R_1$=$CH_2CHCO_2CH_2$ or $R_1$=$CH_2CCH_3CO_2CH_2$; preferably n+m=1 or 2 and X=Y=Z=oxygen; or
compounds (C3) according to the formula (3):

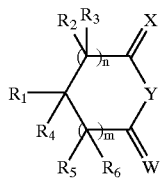

(3)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X and W are independently an oxygen or sulfur atom; Y is an oxygen or sulfur atom or an $NR_7$-group;; n is 0–4; m is 0–4 and n+m=1–4; preferably n+m=1 or 2 and X=W=oxygen; or
a compound (C4) according to the formula (4):

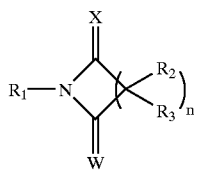

(4)

wherein $R_1$=organic group with a molecular weight between 40 and 20000; $R_2$, and $R_3$, are independently of each other H, an alkyl group having 1–20 C atoms, wherein the alkyl group can be linear, branched or cyclic and may contain heteroatoms like =N, O, S and P or an aryl group having from 6–20 C-atoms; X and W are independently an oxygen or sulfur atom; n is 1–4; preferably n=2 or 3 and X=W= oxygen; or
a compound (C5) according to the formula (5):

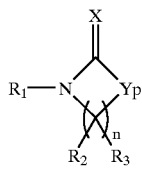

(5)

wherein $R_1$=organic group with a molecular weight between 40 and 20000; $R_2$, and $R_3$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y is an oxygen or sulfur atom or an $NR_7$-group; n is 1–5; p=0, 1; but excluding a compound wherein $R_1$=$CH_2CHCO_2CH_2CH_2$ or R1=$CH_2CCH_3CO_2CH_2CH_2$ with n=2, 3 and X=Y= oxygen; preferably n=2 or 3. If p=0, than X is preferably oxygen, of p=1 than X and Y are preferably oxygen;

or a compound (C6) according to the formula (6):

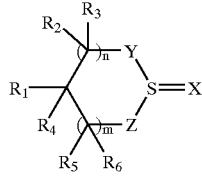

(6)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 0–4; m is 0–4 and n+m=1–4; preferably n+m=1 or 2 and X, Y and Z are oxygen; or
a compound (C7) according to the formula (7):

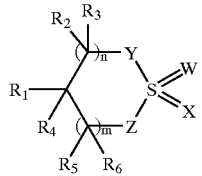

(7)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; W, X, Y and Z are independently an oxygen or sulfur atom or an $NR_7$-group with the proviso that W and X are not both an $NR_7$-group at the same time; n is 0–4; m is 0–4 and n+m=1–4; preferably n+m=1 or 2 and W, X, Y and Z are oxygen; or
a compound (C8) according to the formula (8):

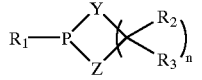

(8)

wherein $R_1$=organic group with a molecular weight between 40 and 20000; $R_2$, $R_3$, and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 1–4; Preferably n=2 or 3 and Y and Z are oxygen;
or a compound (C9) according to the formula (9):

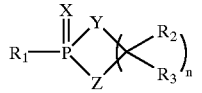

(9)

wherein $R_1$=organic group with a molecular weight between 40 and 20000; $R_2$, $R_3$, and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y is an oxygen or sulfur atom or an $NR_7$-group; n is 1–4. Preferably n=2 or 3 and X, Y and Z are oxygen.

Preferably, component (C6) is not ethylene urea ethyl methacrylate.

Preferably, in each of the components (C1) to (C9), one of the $R_1$ to $R_7$ groups contains a radiation curable functional group, more preferably, $R_1$ contains a radiation curable functional group, even more preferably an acrylate or methacrylate group.

The radiation curable composition according to the present invention can also contain a non-reactive diluent having a calculated Boltzmann average dipole moment of greater than 3.5 Debye, more preferably greater than 4.0 Debye, even more preferable greater than 4.5 Debye, particularly preferred greater than 5.0 Debye, and most preferably greater than 5.5 Debye. The non-reactive diluent can be present in the composition in similar amounts as given above for the high dipole reactive diluent. An example of a high dipole non-reactive diluent according to the present invention is propylene carbonate (D=5). Preferably, the high dipole non-reactive diluent is used together with a high dipole reactive diluent.

Preferably the radiation curable composition contains a radiation curable oligomer (A) or a diluent (B) that comprises a NH- or OH-group, more preferably contains a radiation curable oligomer (A) and a diluent (B) that both comprise a NH- or OH-group, even more preferable a NH-group. It is This N—H or O—H group is non-ionogen and is thus capable of forming hydrogen bonds or improving hydrogen bonding. Preferred examples of suitable N—H groups are amide groups, thioamide, urethane and thiourethane groups.

Amongst reactive diluents that have a comparable high dipole moment in accordance with the present invention, reactive diluents having an ability of formation of H-bonds are preferred, such as reactive diluents containing a NH- or OH-group, since they show an additional increase on the rate of polymerization of the radiation curable composition.

Preferably the components that contain a functional group also have a radiation curable functional group selected from the group consisting of methacrylate, acrylate, vinylether, fumarate, maleate, itaconate, oxolane or epoxy group, more preferably an acrylate or methacrylate group.

Examples of preferred reactive diluents that can be present in the radiation curable compositions are one or more compounds having the formula (10):

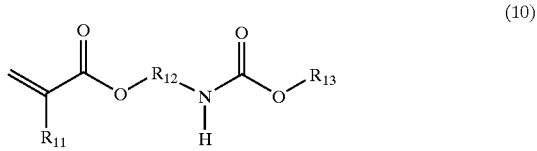
(10)

wherein $R_{11}$=H or Me, $R_{12}$=organic group having 1–20 C-atoms and $R_{13}$ is a heterocyclic group of which the corresponding alcohol has a Boltzmann average dipolemoment of >2.0 Debye, more preferably at least 2.5 Debye, even more preferred at least 3.0 Debye, and most preferred at least 3.5 Debye.

An alternative preferred example of a radiation curable diluent that can be present in the radiation curable composition is a compound according to the formula (11):

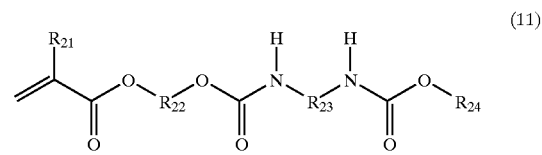
(11)

wherein $R_{21}$=H or Me, $R_{22}$=organic group having 1–20 C-atoms, $R_{23}$=organic group having 1–20 C atoms and $R_{24}$ is a heterocyclic group of which the corresponding alcohol has a Boltzmann average dipolemoment of >2.0 Debye, more preferably at least 2.5 Debye, even more preferred at least 3.0 Debye, and most preferred at least 3.5 Debye.

A different preferred example of a radiation curable component is a component having the the formula (12):

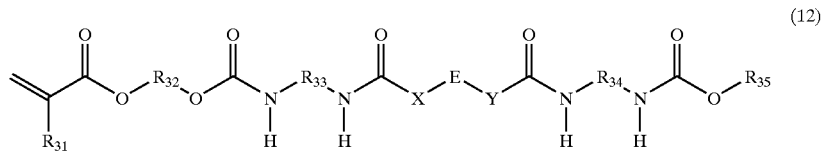
(12)

wherein $R_{31}$=H or Me, $R_{32}$, $R_{33}$ and $R_{34}$=are independently an organic group having 1–20 C atoms, E oligomer or polymer with a molecular weight between 100 and 100000, X and Y are independently oxygen, sulphur or a $NR_7$-group, and $R_{35}$ is a heterocyclic group of which the corresponding alcohol has a Boltzmann average dipolemoment of >2.0 Debye, more preferably at least 2.5 Debye, even more preferred at least 3.0 Debye, and most preferred at least 3.5 Debye.

More preferably E in formula (12) is an oligomer with a molecular weight between 500 and 50000, and most preferred between 1000 and 10000.

Preferably, the above preferred component containing a heterocyclic group of which the corresponding alcohol has a dipole moment of greater than 2.5 Debye is present in the radiation curable composition of the present invention in an amount of at least about 3 wt. % relative to the total amount of components in the composition, more preferably at least about 5 wt. %, even more preferably at least about 10 wt. %. Said component is preferably present in an amount of about 98 wt. % or less relative to the total amount of components in the composition, more preferably 90 wt. % or less, particularly preferred 80 wt. % or less and most preferred 60 wt % or less. Preferably, said component is present in an amount sufficient to increase the cure speed as measured by RT FTIR with at least 3% double bond conversion per second, more preferably at least 5%/sec, even more preferably at least 10%/sec, particularly preferably at least 20%/sec and most preferred at least 50%/sec.

The radiation curable components according to the present invention can be prepared by reactions that are known to the skilled man. Examples of such reactions are a process performed by reacting (i) an hydroxy-, thiol-, or NH-functional (meth)acrylate, preferably, an hydroxy-functional (meth)acrylate,
(ii) a di-or more functional isocyanate, and
(iii) an hydroxy-, thiol-, or NH-functional compound having a Boltzmann average dipolemoment of >2.5 Debye together.

An example of preparation of the radiation curable reactive diluents is the reaction of (i) an hydroxy functional (meth)acrylate,
(ii) a di-functional isocyanate, and
(iii) an hydroxy functional compound having a Boltzmann average dipolemoment of >2.5 Debye together.

A different process is carried out by reacting (i) one equivalent hydroxy functional (meth)acrylate,
(ii) two equivalents of a di-functional isocyanate,
(iii) one equivalent of a di-amine, dihydroxy or dithiol functional compound with an molecular weight of 1000 or less, and
(iv) one equivalent of an hydroxy functional compound having a Boltzmann average dipolemoment of >2.5 Debye together.

A further embodiment relates to a process for the preparation of the radiation curable oligomer of the present invention by reacting (i) one equivalent hydroxy functional (meth)acrylate,
(ii) two equivalents of a di-functional isocyanate,
(iii) one equivalent of a di-amine, dihydroxy or dithiol functional compound with an molecular weight Mn of greater than 1000, and
(iv) one equivalent of an hydroxy functional compound having a Boltzmann average dipolemoment of >2.5 Debye together.

An alternative process for the preparation of the radiation curable oligomer of the present invention is by reacting (i) an hydroxy functional (meth)acrylate,
(ii) a tri-or more functional isocyanate,
(iii) an hydroxy functional compound having a Boltzmann average dipole moment of >2.5 Debye together, and
(iv) an hydroxy-, amine- or thiol-functional oligomer with an average hydroxy or amine functionality >1.5.

The invention is also relating to the use of the novel components and compositions for making coatings, adhesives, inks, for coating of glass fibers and for stereolithography.

Preferably the radiation curable primary coating composition according to the present invention that is used in optical fiber technology comprises a radiation curable oligomer (A), a reactive diluent (B), optionally a photoinitiator (D), wherein the radiation curable primary coating composition has a dielectric constant of greater than 6.25, more preferably greater than 6.5, even more preferably greater than 7.0, particularly preferred greater than 7.5, and most preferably greater than 8.0. Coating compositions with these high dielectric values show very fast curing characteristics which ensures excellent mechanical properties and fast coating speeds of the glass fibers which is an important demand in this technology.

Preferably the radiation curable secondary coating composition comprising a radiation curable oligomer (A), a reactive diluent (B), optionally a photoinitiator (D) has a dielectric constant of greater than 7.0, more preferably greater than 7.25, even more preferably greater than 7.5, particularly preferred greater than 8.0, and most preferably greater than 8.5.

Preferably the radiation curable matrix material comprising a radiation curable oligomer (A), a reactive diluent (B), optionally a photoinitiator (D) has a dielectric constant of greater than 8.75, more preferably greater than 9.0, even more preferably greater than 9.25, most preferably greater than 9.5.

Preferably the clear composition for a colored coating or an ink composition comprising a radiation curable oligomer (A), a reactive diluent (B), optionally a photoinitiator (D) has a dielectric constant of greater than 8.25, more preferably greater than 8.5, even more preferably greater than 8.75, particularly preferred greater than 9.0, and most preferably greater than 9.5.

One way of achieving the fiber optic coating, matrix and ink composition having the dielectric constant according to the present invention is by taking a common fiber optic composition and by replacing therein a monofunctional reactive diluent having a low dipole moment by a monofunctional reactive diluent having a high dipole moment, preferably by a monoacrylate component having a functional group which functional group when attached to the acrylate group is having a dipole moment of higher than 3.5 Debye.

An alternative way of achieving the fiber optic coating, matrix and ink composition having the dielectric constant according to the present invention is by replacing a monofunctional reactive diluent having a low dipole moment by a monoacrylate functional reactive diluent containing a NH-group and containing a functional group of which the corresponding alcohol is having a calculated Boltzmann average dipole moment of greater than 2.5 Debye.

Preferably, at least 3% of the monofunctional component is replaced with the high dipole component, more preferably at least 5%, even more preferably, at least 10%, particularly preferred at least 20%, and most preferred at least 30%. It is particularly preferred to completely replace the monofunctional component with the high dipole component of the present invention. The amount of high dipole component is chosen such as to obtain a radiation curable composition having an optimal balance between high cure speed and other properties, such as the mechanical properties of the coating.

An alternative option is by replacing part of a urethane (meth)acrylate oligomer present in a common fiber optic composition with a urethane (meth)acrylate oligomer containing a heterocyclic group of which the corresponding alcohol has a calculated Boltzmann average dipole moment of greater than 2.5 Debye. A further option is to formulate the fiber optic coating, matrix or ink composition according to the present invention by using at least one of the components selected from the list consisting of a high dipole moment non-reactive diluent (preferably having a dipole moment of at least 3.5 Debye), a high dipole moment reactive diluent (preferably having a dipole moment of at least 3.5 Debye), a high dipole moment oligomer, or mixtures thereof.

The reactivity and photosensitivity of the primary and secondary optical fiber coatings of the present invention can also be improved by tuning the volumetric thermal expansion coefficient at 23° C. ($\alpha_{23}$) of the coating.

The volumetric thermal expansion coefficient $\alpha 23$ of a coating at 23° C. can be defined by the following formula (13):

$$\alpha_{23}=1/V(\delta V/\delta T) \quad (13)$$

wherein V represents the specific volume (m³/kg) or the inverse of the density of the system, ($\delta V/\delta T$) represents the change in specific volume of the system as a function of the temperature and T=23° C. The thermal expansion coefficient $\alpha_{23}$ of several coating systems can be predicted on the basis of chemical structural information by using a commercial software package, module Synthia of MSI, as indicated in the test method section. In the present invention, $\alpha_{23}$ has been calculated in this way.

The present inventors have now found that the thermal expansion coefficient $\alpha_{23}$ for the primary and secondary coatings of the present invention is related to the cohesive energy density, defined as the total amount of non-covalent interactions in the system, such as hydrogen bonding or dipolar interactions. Alternatively, one could say that the volumetric expansion coefficient is related to the polarity of the system.

Therefore, according to one particular embodiment of the present invention, the expansion coefficient $\alpha_{23}$ of the primary and secondary coating system can be decreased by increasing the cohesive energy density (CED) or the polarity of the system, preferably by adding components to the composition that have a functional group having a dipole moment of greater than 2.5 Debye, more preferably, greater than 3.5 Debye, particularly preferred by adding the high dipole components according to the present invention in the preferred amounts.

Therefore, an alternative aspect of the present invention relates to a radiation curable primary and secondary coating composition comprising a radiation curable oligomer (A), a reactive diluent (B), and optionally a photoinitiator (D) having a calculated volumetric thermal expansion coefficient $\alpha_{23}$ of about $6.85 \times 10^{-4}$ K$^{-1}$ or less. Said primary and secondary coating compositions show an enhanced reactivity and photosensitivity, and consequently a higher cure speed.

Preferably, the primary coatings have a volumetric thermal expansion coefficient $\alpha_{23}$ of about $6.70 \times 10^{-4}$ K$^{-1}$ or less, more preferred about $6.60 \times 10^{-4}$ K$^{-1}$ or less, even more preferred about $6.50 \times 10^{-4}$ K$^{-1}$ or less, and most preferred about $6.30 \times 10^{-4}$ K$^{-1}$ or less.

Preferably, the $\alpha_{23}$ of the secondary coating is about $6.5 \times 10^{-4}$ K$^{-1}$ or less, particularly preferred, about $6.2 \times 10^{-4}$ K$^{-1}$ or less, more preferred about $6.0 \times 10^{-4}$ K$^{-1}$ or less, and most preferred about $5.8 \times 10^{-4}$ K$^{-1}$ or less.

The relation between $\alpha_{23}$ and rate (cure speed) is shown for the following secondary-type coatings U, V, W and Z as shown in Table 1. The polarity decreases going from composition U to Z. Said coatings have been prepared with an identical concentration of double bonds, and with the same amount of di- or higher functional material, thus having the same crosslink density. The rate has been measured by RT FTIR as described in the test method section.

TABLE 1 relation between $\alpha_{23}$ and rate of secondary-type coatings U–Z

| | Coating Composition | | | |
|---|---|---|---|---|
| | U Wt. % | V Wt. % | W Wt. % | Z Wt. % |
| Components | | | | |
| HEA-IPDI-pTHF1000-IPDI-HEA | 50 | 50 | 50 | 50 |
| HEA | 32.8 | 32.8 | | |
| HEA-IPDI-5CC | 17.2 | | | |
| SR504 | | 17.2 | 5.5 | |
| Butyl acrylate | | | | 31 |
| Lauryl acrylate | | | | 19 |
| Ethoxy ethyl acrylate | | | 44.5 | |
| Irgacure 184 | 1 | 1 | 1 | 1 |
| Calculated $\alpha_{23}$ (×10$^{-4}$ K$^{-1}$) | 6.42 | 6.71 | 7.04 | 7.35 |
| Rate (mol/l sec) | 2.99 | 2.67 | 2.50 | 2.29 |

Abbreviations and tradenames:
HEA = 2-hydroxyethylacrylate;
IPDI = isophorone diisocyanate;
pTHF = polytetrahydrofuran having Mn of 1000;
HEA-IPDI-5CC = component of Ex. 11;
SR504 = ethoxylated (n = 4) nonyl phenol acrylate;
Irgacure 184 = photoinitiator The results in Table 1 show that the cure speed increases upon decreasing volumetric expansion coefficient (and thus increasing polarity) of the coating system.

Suitable coating compositions for achieving the desired volumetric thermal expansion coefficient preferably contain one or more of the following constituents: one or more reactive diluents selected from the group consisting of 1-(2-hydroxypropyl)3-phenoxy acrylate, vinyl caprolactam, vinyl pyrrolidone, N butylurethane O ethyl acrylate (CL1039), butyrolactone acrylate, acryloyloxy-dimethyl-butyrolactone, a component having a functional group which, when attached to an acrylate group, has a calculated Boltzmann average dipole moment of greater than 3.5, a component containing a heterocyclic group of which the corresponding alcohol has a calculated Boltzmann average dipole moment of greater than 2.5 Debye, and the like, or mixtures thereof; one or more oligomers selected from the group consisting of polyether (urethane) (meth)acrylate, polyester (urethane) (meth)acrylate, polyether/polycarbonate copolymer based (urethane) (meth)acrylate, polyether/polyester copolymer based (urethane) (meth) acrylate and the like, of which, an ethylene oxide/butylene oxide based urethane (meth)acrylate and a polyether/polycarbonate copolymer based urethane (meth)acrylate are preferred.

The radiation curable composition of the present invention preferably is substantially solvent free. This means that the composition as stored and/or applied does contain less than 5 wt %, preferably less than 2 wt % organic solvent that is not coreactive in polymerisation reactions. These solvents have to or will evaporate before, during or after cure. In a particular preferred embodiment, the amount of non reactive solvent is less than 0.5 wt %.

The radiation curable composition preferably has more than 90 wt % radical curable components.

In another preferred embodiment, the composition is a hybrid which means that the composition further comprises a cationic curable component and a photo sensitive cationic initiator.

The radiation curable composition consists of a radiation curable oligomer and a radiation curable diluent. Each of the components may be mono or polyfunctional, poly meaning 2 or more functional. Generally, the functionality of the radiation curable components is 12 or lower. Preferred functionality for at least one of the components is 2–4.

The terms diluent and oligomer are used in this specification to denote a compound with lower or higher viscosity and/or molecular weight respectively. The oligomer generally will have a molecular weight Mn of about 400 or higher, preferably between 500 and 100,000, more preferably between 1000 and 50,000, particularly preferred between 1500 and 20,000, and most preferably between 2000 and 10,000. The oligomer generally will have an average functionality of about 1.2 or higher, preferably an average functionality of about 1.8–4.

The reactive diluent has a viscosity that is lower than the viscosity of the oligomer. In case an oligomer is used with high viscosity, the diluent may have a molecular weight up to about 700, preferably, up to about 600, more preferably, up to about 500.

The present invention can be used in fiber optic coating materials, coating meaning primary or secondary coating, inks, ribbon matrix materials, encapsulating matrix materials, bundling materials and the like.

Optical fiber coating materials may comprise as an oligomer a urethane (meth)acrylate oligomer, comprising an (meth)acrylate group, urethane groups and a backbone. The backbone is derived from a polyol that has been reacted with a diisocyanate and hydroxyalkylacrylate.

Examples of suitable polyols are polyether polyols, polyester polyols, polycarbonate polyols, amide polyols, polycaprolactone polyols, acrylic polyols, and other polyols. These polyols may be used either individually or in combinations of two or more. There are no specific limitations to the manner of polymerization of the structural units in these polyols. Any of random polymerization, block polymerization, or graft polymerization is acceptable.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG#1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting ε-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 21 ON, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. Specifically, polyols containing polytetramethylene glycol and copolymer glycols of butyleneoxide and ethyleneoxide are particularly preferred.

The reduced number average molecular weight derived from the hydroxyl number of these polyols is usually from 50 to 15,000, and preferably from 1,000 to 8,000.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxyethyl(meth)acrylate, 2-hydroxypropylacrylate and 2-hydroxy-3-oxyphenyl(meth)acrylate. Acrylate functional groups are preferred over methacrylates.

The ratio of polyol, polyisocyanate, and hydroxyl group-containing (meth)acrylate used for preparing the urethane (meth)acrylate is determined so that 1.1 to 3 equivalents of an isocyanate group included in the polyisocyanate and 0.1 to 1.5 equivalents of a hydroxyl group included in the hydroxyl group-containing (meth)acrylate are used for one equivalent of the hydroxyl group included in the glycol.

In the reaction of these three components, an urethanation catalyst such as copper naphthenate, cobalt naphthenate, zinc naphthenate, di-n-butyl tin dilaurate, triethylamine, and triethylenediamine-2-methyltriethyleneamine, and the like is usually used in an amount from 0.01 to 1 wt % of the total amount of the reactant. The reaction is carried out at a temperature from 10 to 900C, and preferably from 30 to 80° C.

The number average molecular weight of the urethane (meth)acrylate used in the composition of the present invention is preferably in the range from 1200 to 20,000, and more preferably from 2,200 to 10,000. If the number average molecular weight of the urethane (meth)acrylate is less than 1000, the resin composition tends to solidify; on the other hand, if the number average molecular weight is greater than 20,000, the viscosity of the composition becomes high, making handling of the composition difficult.

The urethane (meth)acrylate is used in an amount from 5 to 90 wt %, and preferably from 20 to 80 wt %, of the total amount of the resin composition. When the composition is used as a coating material for optical fibers, the range from 20 to 80 wt % is particularly preferable to ensure excellent coatability, as well as superior flexibility and long-term reliability of the cured coating. The primary coating compositions according to the present invention preferably contain from 20 to 70 wt. % oligomer and 80 to 30 wt. % of the high dipole component, more preferably from 30 to 60 wt. % oligomer and from 70 to 40 wt. % of the high dipole component, particularly preferred from 40 to 50 wt. % oligomer and from 60 to 50 wt. % of the high dipole component. The secondary coating, matrix and clear compositions according to the present invention preferably contain from 10 to 50 wt. % oligomer and 90 to 50 wt. % of the high dipole component, more preferably from 20 to 40 wt. % oligomer and from 80 to 60 wt. % of the high dipole component, particularly preferred from 25 to 30 wt. % oligomer and from 75 to 70 wt. % of the high dipole component.

Other oligomers that can be used include polyester (meth)acrylate, epoxy(meth)acrylate, polyamide(meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based (meth)acrylateoligomers such as alkoxylated bisphenol A diacrylate and diglycidyl bisphenol ether A diacrylate. Combinations of different oligomers may also be used for an optimization of properties of the cured products.

Suitable reactive diluents are examplified herein below.

Polymerizable vinyl monomers such as polymerizable monofunctional vinyl monomers containing one polymerizable vinyl group in the molecule and polymerizable polyfunctional vinyl monomers containing two or more polymerizable vinyl groups in the molecule may be added to the liquid curable resin composition of the present invention.

Given as specific examples of the polymerizable monofunctional vinyl monomers are vinyl monomers such as N-vinylpyrrolidone, N-vinylcaprolactam, vinylimidazole, and vinylpyridine; (meth)acrylates containing an alicyclic structure such as isobornyl(meth)acrylate, bornyl(meth)acrylate, tricyclodecanyl(meth)acrylate, dicyclopentanyl (meth)acrylate, dicyclopentenyl (meth)acrylate, and cyclohexyl(meth)acrylate; benzyl(meth)acrylate, 4-butylcyclohexyl(meth)acrylate, acryloylmorpholine, 2-hydroxyethyl(meth)acrylate, 2-hydroxypropyl(meth)acrylate, 2-hydroxybutyl(meth)acrylate, methyl (meth)acrylate, ethyl(meth)acrylate, propyl(meth)acrylate, isopropyl (meth)acrylate, butyl(meth)acrylate, amyl(meth)acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl (meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isostearyl(meth)acrylate, tetrahydrofurfuryl(meth)acrylate, butoxyethyl(meth)acrylate, ethoxydiethylene glycol (meth)acrylate, benzyl (meth)acrylate, phenoxyethyl(meth)acrylate, polyethylene glycol mono(meth)acrylate, polypropylene glycol mono (meth)acrylate, methoxyethylene glycol(meth)acrylate, ethoxyethyl(meth)acrylate, methoxypolyethylene glycol (meth)acrylate, methoxypropylene glycol(meth)acrylate, diacetone(meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxy butyl vinyl ether, lauryl vinyl ether, cetyl vinyl ether, 2-ethylhexyl vinyl ether, (meth)acrylatemonomers shown by the following formulas (14) to (16),

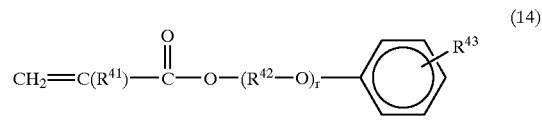
(14)

wherein $R^{41}$ is a hydrogen atom or a methyl group, $R^{42}$ is an alkylene group having 2–6, and preferably 2–4 carbon atoms, $R^{43}$ is a hydrogen atom or an organic group containing 1–12 carbon atoms or an aromatic ring, and r is an integer from 0 to 12, and preferably from 1 to 8,

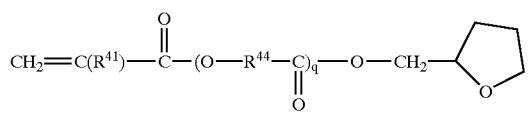

(15)

wherein $R^{41}$ is the same as defined above, $R^{44}$ is an alkylene group having 2–8, and preferably 2–5 carbon atoms, and q is an integer from 1 to 8, and preferably from 1 to 4,

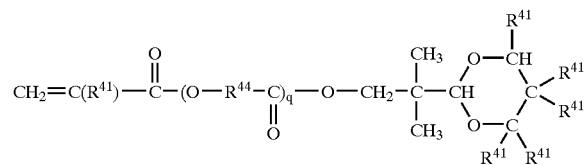

(16)

wherein $R^{41}$, $R^{44}$, and q are the same as defined above.

Preferably, the radiation curable compositions according to the present invention do not contain methyl methacrylate.

As examples of commercially available products of the polymerizable monofunctional vinyl monomers, Aronix M102, M110, M111, M113, M117 (manufactured by Toagosei Co., Ltd.), LA, IBXA, Viscoat #190, #192, #2000 (manufactured by Osaka Organic Chemical Industry Co., Ltd.), Light Acrylate EC-A, PO-A, NP-4EA, NP-8EA, M-600A, HOA-MPL (manufactured by Kyoeisha Chemical Co., Ltd.), KAYARAD TC110OS, R629, R644 (manufactured by Nippon Kayaku Co., Ltd.), and the like can be given.

Given as examples of the polymerizable polyfunctional vinyl monomers are the following (meth) acrylatecompounds: trimethylolpropane tri(meth)acrylate, pentaerythritol tri(meth)acrylate, ethylene glycol di(meth) acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth) acrylate, trimethylolpropanetrioxyethyl(meth)acrylate, tris (2-hydroxyethyl)isocyanurate tri(meth)acrylate, tris(2-hydroxyethyl)isocyanurate di(meth)acrylate, bis (hydroxymethyl)tricyclodecane di(meth)acrylate, di(meth) acrylate of a diol which is an addion compound of ethylene oxide or propylene oxide to bisphenol A, di(meth)acrylate of a diol which is an addition compound of ethylene oxide or propylene oxide to hydrogenated bisphenol A, epoxy(meth) acrylate obtained by the addition of (meth)acrylate to diglycidyl ether of bisphenol A, di(meth)acrylate of polyoxyalkylene bisphenol A, and triethylene glycol divinyl ether.

Examples of commercially available products of the polymerizable polyfunctional vinyl monomers include Yupimer UV SA1002, SA2007 (manufactured by Mitsubishi Chemical Corp.), Viscoat #195, #230, #215, #260, #335HP, #295, #300, #700 (manufactured by Osaka Organic Chemical Industry Co., Ltd.), Light Acrylate 4EG-A, 9EG-A, NP-A, DCP-A, BP-4EA, BP-4PA, PE-3A, PE-4A, DPE-6A (manufactured by Kyoeisha Chemical Co., Ltd.), KAYARAD R-604, DPCA-20,-30,-60,-120, HX-620, D-310, D-330 (manufactured by Nippon Kayaku Co., Ltd.), Aronix M-208, M-210, M-215, M-220, M-240, M-305, M-309, M-315, M-325 (manufactured by Toagosei Co., Ltd.), and the like.

These polymerizable vinyl monomers are preferably used in an amount from 1 to 70 wt %, and more preferably from 15 to 60 wt %, of the total amount of the resin composition. If the amount is less than 10 wt %, the viscosity of the composition may become so high that coatability is impaired. The amount exceeding 70 wt % may result in not only an increased cure shrinkage, but also insufficient toughness of the cured products.

The liquid curable resin composition of the present invention is cured by radiation, and a photo-polymerization initiator can be used. In addition, a photosensitizer or synergist can be added as required. Given as examples of the photo-polymerization initiator are 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyidiphenylphosphine oxide, bis-(2,6-dimethoxybenzoyl)-2,4,4-trimethylpentylphosphine oxide, bis-(2,4,6-trimethylbenzoyl)phenylphosphine oxide and the like. Mixtures of these photo-polymerization initiators may also be used.

Examples of commercially available products of the photo-polymerization initiator include IRGACURE 184, 369, 651, 500, 907, CGI1700, 1750, 1850, 819, CG24-61, Darocur 1116, 1173 (manufactured by Ciba Specialty Chemicals Co., Ltd.), Lucirin LR8728 (manufactured by BASF), Ubecryl P36 (manufactured by UCB), and the like.

Given as examples of the photosensitizer or synergist are triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate, and the like. As commercially available products of the photosensitizer, for example, Ebecryl P102, 103, 104, and 105 (manufactured by UCB) are given. Use of mixtures of synergists is also possible.

The amount of the polymerization initiator used here is preferably in the range from 0.1 to 10 wt %, and more preferably from 0.5 to 7 wt %, of the total amount of the components for the resin composition.

Beside the above-described components, other curable oligomers or polymers may be added to the liquid curable resin composition of the present invention to the extent that the characteristics of the liquid curable resin composition are not adversely affected.

An amine compound can be added to the liquid curable resin composition of the present invention to prevent generation of hydrogen gas, which causes transmission loss in the optical fibers. As examples of the amine which can be used here, diallylamine, diisopropylamine, diethylamine, diethylhexylamine, and the like can be given.

In addition to the above-described components, various additives such as antioxidants, UV absorbers, light stabilizers, silane coupling agents, coating surface improvers, heat polymerization inhibitors, leveling agents, surfactants, colorants, preservatives, plasticizers, lubricants, solvents, fillers, aging preventives, and wettability improvers can be used in the liquid curable resin composition of the present invention, as required. Examples of antioxidants include Irganox1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like; examples of silane coupling agents include aminopropyltriethoxysilane, mercaptopropyltrimethoxysilane, and methacryloxypropyltrimethoxysilane, and commercially available products such as SH6062, SH6030 (manufactured by Toray-Dow Corning Silicone Co., Ltd.), and KBE903, KBE603, KBE403 (manufactured by Shin-Etsu Chemical Co., Ltd.); examples of coating surface improvers include silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The viscosity of the liquid curable resin composition of the present invention is usually in the range from 200 to 20,000 mPa·sec, and preferably from 2,000 to 15,000 mPa·sec.

The radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for primary coatings for fiber optics. More in particular, primary coatings with an equilibrium modulus of less than 1.5 MPa, preferably less than 1.3 MPa and more preferably less than 1.0 MPa are most preferred. In contrast, suitable compositions for secondary coatings, inks and matrix materials generally have a modulus of above 50 MPa, with secondary coatings tending to have a modulus more particularly above 100 up to 2,000 MPa and matrix materials tending to be more particularly between about 50 MPa to about 200 MPa for soft matrix materials, and between 200 to about 1500 MPa for hard matrix materials. The radiation-curable composition of the present invention may be formulated such that the composition after cure has a Tg between −70° C. and 130° C. The Tg is measured as the peak tan-delta in a DMA curve at 2.5% elongation.

Elongation and tensile strength of these materials can also be optimized depending on the design criteria for a particular use. For cured coatings formed from radiation-curable compositions formulated for use as primary coatings on optical fibers, the elongation-at-break is typically greater than 80%, more preferably the elongation-at-break is at least 110%, more preferably at least 150% but not typically higher than 400%. For coatings formulated for secondary coatings, inks and matrix materials the elongation-at-break is typically between 10% and 100%, and preferably higher than 30%.

The glass transition temperature (Tg), measured as the peak tan-delta determined by dynamic mechanical analysis (DMA), can be optimized depending on the particulars of the application. The glass transition temperature may be from 10° C. down to −70° C. or lower, more preferably lower than 0° C. for compositions formulated for use as primary coatings and 10° C. to 120° C. or higher, more preferably above 30° C., for compositions designed for use as secondary coatings, inks and matrix materials.

The compositions of the present invention will preferably have a cure speed of 1.0 J/cm$^2$ of less (at 95% of maximum attainable modulus). For an secondary coating, ink or matrix material, cure speed is preferably about 0.5 J/cm$^2$ or less (at 95% of maximum attainable modulus), and more preferably, about 0.3 J/cm$^2$ or less, and even more preferably, about 0.2 J/cm$^2$ or less.

The cured products obtained by the polymerization of the resin composition of the present invention are particularly suitable for use as a coating material for optical fibers, optical fiber ribbons, and the like including primary coatings, secondary coatings, colored secondary coatings, inks, matrix materials and bundling materials.

The present invention also relates to a coated optical fiber comprising a glass optical fiber, a primary coating applied thereon, a secondary coating applied on the primary coating and optionally an ink composition applied on the secondary coating, wherein at least one of the primary coating, secondary coating or ink composition comprises a a radiation curable oligomer (A)
b a diluent (B), wherein at least one of (A) or (B) is a component having a functional group which has a calculated Boltzmann average dipole moment of higher than 2.5 Debye and to an optical fiber ribbon comprising a plurality of said coated, and optionally colored optical fibers arranged in a plane and embedded in a matrix composition.

The compositions of the present invention can very well be used as DVD adhesives or lackers on CD/DVD disks.

For an adhesive coating, density at 25° C. is about 1.02 g/ml. The adhesive composition preferably has a viscosity of about 100 to about 30,000 mPas at 25° C. Elongation is preferably at least 2% or more. The shrinkage upon cure should be ≦7%, with respect to the density of cured material. Bond strength is preferably rated about 4 to about 5. Shear strength is preferably about 10 lbs to about 50 lbs. Cured adhesive bonds are preferably stable under exposure to about 85° C. at about 85% relative humidity for at least 96 hrs.

The compounds forming the radiation curable adhesive compositions are combined to form a, preferably, thixotropic mixture and coated on, for example, one surface of each of two polycarbonate substrates forming the DVD, which surfaces are already coated with an aluminum, gold or other layer encoded with audio, video or other information and preferably protected by a UV curable lacquer. The adhesive is coated on the substrates by screen printing or other suitable method known in the art. The adhesive on the substrates is then cured with ultraviolet radiation preferably at a dose of about 0.2–1.0 J/cm$^2$, for example about 0.4 J/cm$^2$. Radiation-cure may be effected using a fusion lamp equipped with a "H" bulb or a "D" bulb from Fusion Curing Systems, Rockville, Md., or the equivalent thereof, in an air atmosphere. The cured adhesive coated substrates are superimposed on each other with the adhesive bonding the substrate layers together, thereby forming a single DVD having one or preferably two layers of encoded audio or video information which may be read in a DVD player. Substrate layers which may be bonded by the invention in various combinations comprise plastics, metallics and ceramics. The adhesive compositions are preferably applied to the disc layers by screen printing.

The production of and useful characteristics for optical disc adhesives are discussed in, for example, U.S. Pat. Nos. 4,861,637, 4,906,675 5,360,652, 5,663,211, 5,227,213 and 5,213,947.

In one embodiment of the invention, the compositions can comprise at least one radiation-curable (meth)acrylate oligomer, at least one radiation-curable reactive diluent, at least one photoinitiator, as described above for optical glass fiber coatings. In another embodiment, the composition further comprises at least one epoxy compound, optionally at least one diol and optional additives. The weight ratio of the cationic component to the radically curable component of the composition may be from about 99:1 to about 20:80, preferably from about 80:20 to as low as about 40:60, and more preferably is from about 60:40 to about 50:50. Additives will bring the total weight value to 100% in each case.

The composition may be tailored to maximize the adhesiveness, reduce the viscosity, shorten cure speed, and the like of the cured material. For example, radical polymerizable monomers and optionally silane compounds, may be added at varying effective concentrations to achieve improved viscosity and adhesion, respectively. By altering the ratios of components, other desirable properties may be promoted, such as high optical transparency, hardness, chemical resistance, and abrasion resistance.

If a hybrid composition is used, the composition contains at least one cationic curable epoxy resin, preferably present in an amount from about 10 wt. % to about 99 wt. %. Suitable epoxy resins include bisphenol-A, cycloaliphatic epoxides, bisphenol-F, and mixtures thereof. Preferred epoxy resins include mixed cycloaliphatic epoxides, bis-(3, 4-epoxycyclohexyl) adipate, bisphenol-A epoxide and bisphenol-F epoxide. Bisphenol-A epoxide is known to give good surface cure. Excellent through cure is achievable with bisphenol-F epoxide, and is most preferred.

The composition preferably comprises a polyol, which can be a low molecular compound (with e.g. an Mw of less than 500) and 2–6 hydroxy groups, preferably 2–3 hydroxy groups. Alcohols and polyols can behave as chain transfer agents and as co-curing agents with epoxides, improving cure speed of cationic formulations. Suitable polyols include ε-caprolactone triol crosslinking agents of viscosities at 55° C. ranging from 2250 cP to 2700 cP. Other examples of suitable polyols include ethyleneglycol, diethyleneglycol, 1,2-propanediol, 1,3-propanediol, 1,2-butanediol, 1,4-butanediol, pentaeritritol, trimethylolpropane and the like. The amount of the polyol—if present—preferably is 1 to 70 wt %, preferably 2–50 wt % and most preferred 3–20 wt %. Low molecular polyols and in particular diols having 1–8 carbon atoms are preferred because these aid in achieving a low viscosity. Ethyleneglycol is most preferred.

Hybrid compositions often are used in stereolithography, or 3D-modelling. The cationic curable component generally has a molecular weight of between 120 and 10,000, preferably between 150 and 5,000, more preferably between 180 and 2,000.

Examples of such a compound include epoxy compounds, oxetane compounds, oxolane compounds, cyclic acetal compounds, cyclic lactone compounds, thiirane compounds, thiethane compounds, vinyl ether compounds, spiro orthoester compounds obtained by the reaction of an epoxy compound with at least one lactone compound, ethylenically unsaturated compound, cyclic ether compound, cyclic thioether compound, vinyl compound, and/or the like.

Preferred cationically polymerizable organic compounds include glycidyl ether compounds, including di-, tri- and polyglycidyl ether compounds, and alicyclic ether compounds including those comprising residue of carboxylic acids such as, for example, alkylcarboxylic acid residual groups, alkylcycloalkylcarboxylic acid residual groups and dialkyl dicarboxylic acid residual groups. Suitable epoxy compounds that can be used include, for example, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-1,4-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate,3,4-epoxy-6-methylcyclohexyl-3',4'-epoxy-6'-methylcyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, polyglycidyl ethers of polyether polyol obtained by the addition of one or more alkylene oxides to aliphatic polyhydric alcohols such as ethylene glycol, propylene glycol, and glycerol, diglycidyl esters of aliphatic long-chain dibasic acids, monoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxybutylstearic acid, epoxyoctylstearic acid, epoxidated linseed oil, epoxidated polybutadiene, and the like can be given.

Examples of other cationically polymerizable organic compounds which can be used include oxetanes such as trimethylene oxide, 3,3-dimethyloxetane, 3,3-dichloromethyloxetane, 3-ethyl-3-phenoxymethyloxetane, and bis(3-ethyl-3-methyloxy)butane; oxolanes such as tetrahydrofuran and 2,3-dimethyltetrahydrofuran; cyclic acetals such as trioxane, 1,3-dioxolane, and 1,3,6-trioxanecyclooctane; cyclic lactones such as β-propylolactone and ε-caprolactone; thiiranes such as ethylene sulfide, 1,2-propylene sulfide, and thioepichlorohydrin; thiethanes such as 3,3-dimethylthiethane; vinyl ethers such as ethylene glycol divinyl ether, triethylene glycol divinyl ether, trimethylolpropane trivinyl ether; spiro orthoesters obtained by the reaction of an epoxy compound and lactone; ethylenically unsaturated compounds such as vinylcyclohexane, isobutylene, and polybutadiene; derivatives of the above compounds; and the like.

Of these cationically polymerizable organic compounds, bisphenol A diglycidyl ether, bisphenol F diglycidyl ether, hydrogenated bisphenol A diglycidyl ether, hydrogenated bisphenol F diglycidyl ether, 3,4-epoxycyclohexylmethyl-3',4'-epoxycyclohexanecarboxylate, bis(3,4-epoxycyclohexylmethyl)adipate, 1,4-butanediol diglycidyl ether, 1,6-hexanediol diglycidyl ether, glycerol triglycidyl ether, trimethylolpropane triglycidyl ether, neopentyl glycol diglycidyl ether, polyethylene glycol diglycidyl ether, and polypropylene glycol diglycidyl ether are preferable.

As even more preferred cationically polymerizable organic compounds epoxy compounds having two or more alicyclic epoxy groups in a molecule such as 3,4-epoxycyclohexylmethyl-3',4'-epoxycyclohexanecarboxylate, and bis(3,4-epoxycyclohexylmethyl)adipate can be given.

As examples of commercially available products of the cationically polymerizable organic compounds suitably used, UVR-6100, UVR-6105, UVR-6110, UVR-6128, UVR-6200, UVR-6216 (manufactured by Union Carbide Corp.), Celoxide 2021, Celoxide 2021 P, Celoxide 2081, Celoxide 2083, Celoxide 2085, Celoxide 2000, Celoxide 3000, Glycidole, AOEX 24, Cyclomer A200, Cyclomer M1 00, Epolead GT-300, Epolead GT-301, Epolead GT-302, Epolead GT-400, Epolead 401, Epolead 403 (manufactured by Daicel Chemical Industries, Ltd.), Epicoat 828, Epicoat 812, Epicoat 1031, Epicoat 872, Epicoat CT508 (manufactured by Yuka-Shell Epoxy K.K.), KRM-2100, KRM-2110, KRM-2199, KRM-2400, KRM-2410, KRM-2408, KRM-2490, KRM-2200, KRM-2720, KRM-2750 (manufactured by Asahi Denka Kogyo Co., Ltd.), Rapi-Cure DVE-3, CHVE, PEPC (manufactured by ISP), VECTO-MER 2010, 2020, 4010, 4020 (manufactured by AlliedSignal), and the like can be given.

The proportion of the cationic curable component used in the photocurable resin composition of the present invention is usually, relative to the total composition, 20–85 wt %, preferably 30–80 wt %, and more preferably 40–75 wt %. If the proportion is too small, three-dimensional objects formed from the resin composition may exhibit insufficient dimensional accuracy and deformation with time may be caused. On the other hand, if the proportion is too large, the resin composition may exhibit inferior photocurability which may result in inefficient fabrication.

Hybrid resin compositions as for example used in DVD adhesives or 3D modelling preferably comprise a cationic photoinitiator.

The cationic photopolymerization initiator of the photo-curable resin composition of the present invention evolves a material which initiates cationically polymerization by exposure to energy rays such as radiation. Here, energy rays such as radiation include visible rays, ultraviolet rays, infrared rays, X-ray, α-rays, β-rays, γ-rays, and the like. As examples of preferable compounds used as the component (B), onium salts represented by formula (17) can be given:

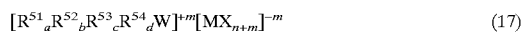

$$[R^{51}_aR^{52}_bR^{53}_cR^{54}_dW]^{+m}[MX_{n+m}]^{-m} \quad (17)$$

wherein a cation is an onium ion; W represents S, Se, Te, P, As, Sb, Bi, O, I, Br, Cl, or —N≡N; $R^{5'}$, $R^{52}$, $R^{53}$, and $R^{54}$ independently represent organic groups; a, b, c, and d independently represent integers from 0–3, provided that the total of (a+b+c+d) is equal to the of valence of W; M is a metal or a metalloid which constitutes a center atom of the halide complex $[MX_{n+m}]^{-m}$, for example, M represents B, P, As, Sb, Fe, Sn, Bi, Al, Ca, In, Ti, Zn, Sc, V, Cr, Mn, Co; X represents a halogen atom such as F, Cl, and Br; m represents a positive charge of a halide complex ion; and n represents a valence of M. This onium salt evolves Lewis acids by irradiation.

As specific examples of an anion $[MX_{n+m}]^{-m}$ in the above formula (17), tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), tetrakispentafluorophenylborate and the like can be given.

Moreover, onium salts having an anion represented by the formula [MXn(OH)—] and onium salts having other anions such as perchloric acid ion ($ClO_4^-$), trifluoromethane sulfonic acid ion ($CF_3SO_3^-$), fluorosulfonic acid ion ($FSO_3^-$), toluenesulfonic acid ion, trinitrobenzenesulfonic acid anion, trinitrotoluenesulfonic acid anion can also be used.

Of these onium salts, aromatic onium salts are more preferred. Examples of such aromatic onium salts include: aromatic halonium salts disclosed in, for example, Japanese Patent Applications Laid-open No. 151996/1975 and No. 158680/1975, VIA group aromatic onium salts disclosed in, for example, Japanese Patent Applications Laid-open No. 151997/1975, No. 30899/1977, No. 55420/1981, and No. 125105/1980; VA group aromatic onium salts disclosed in, for example, Japanese Patent Application Laid-open No. 158698/1975; oxosulfoxonium salts disclosed in, for example, Japanese Patent Applications Laid-open No. 8428/1981, No. 149402/1981, and No. 192429/1982; aromatic diazonium salts disclosed in, for example, Japanese Patent Application Laid-open No. 17040/1974; thiopyrylium salts disclosed in, for example, U.S. Pat. No. 4,139,655; and the like. In addition, iron/allene complex initiators, aluminum complex/photolysis silicon compound initiators, and the like can also be given as examples.

As examples of commercially available products of cationic photopolymerization initiators, UVI-6950, UVI-6970, UVI-6974, UVI-6990 (manufactured by Union Carbide Corp.), Adekaoptomer SP-150, SP-151, SP-170, SP-171 (manufactured by Asahi Denka Kogyo Co., Ltd.), Irgacure 261 (manufactured by Ciba Specialty Chemicals Co., Ltd.), CI-2481, CI-2624, CI-2639, CI-2064 (manufactured by Nippon Soda Co., Ltd.), CD-1010, CD-1011, CD-1012 (manufactured by Sartomer Co., Ltd.), DTS-102, DTS-103, NAT-103, NDS-103, TPS-103, MDS-103, MPI-103, BBI-103 (manufactured by Midori Chemical Co., Ltd.), PCI-061T, PCI-062T, PCI-020T, PCI-022T (manufactured by Nippon Kayaku Co., Ltd.), and the like can be given. Of these, UVI-6970, UVI-6974, Adekaoptomer SP-170, SP-171, CD-1012, and MPI-103 are particularly preferable in view of higher photocuring sensitivity of the resulting resin composition.

These cationic photopolymerization initiators can be used either individually or in combinations of two or more.

The proportion of the cationic initiator used in the photocurable resin composition of the present invention is usually, relative to the total weight of the composition, 0.1–10 wt %, preferably 0.2–5 wt %, and more preferably 0.3–3 wt %.

A further preferred compound in hybrid compositions is a polyol having two or more hydroxyl groups, preferably three or more hydroxyl groups.

The polyol having two or more hydroxyl groups is a component for developing the photo-curability of the resin composition. The polyol provides assistance to the three-dimensional object to prevent deformation over time (i.e., shape stability) and resistance to change in mechanical characteristics over time (i.e., physical property stability). Preferably, the polyol has two or more, preferably 2–6 hydroxyl groups. If polyols having more than six hydroxyl groups are used, the elongation and toughness of the resulting three-dimensional object tends to be lower.

Preferred examples include polyether polyols having three or more, and preferably from 3 to 6 hydroxyl groups in a molecule. Use of polyether polyols having less than two hydroxyl groups in a molecule (polyether diol) may result in insufficient photocurability of the resin composition and decreased mechanical properties, in particular, low modulus of elasticity of the resulting three-dimensional objects. On the other hand, if polyether polyols having more than six hydroxyl groups in a molecule are used, the resulting three-dimensional objects may exhibit insufficient elongation and decreased moisture resistance.

As examples of the polyol, polyether polyols obtained by modifying polyhydric alcohols having more than three hydroxyl groups such as trimethylolpropane, glycerol, pentaerythritol, sorbitol, sucrose, and quadrol with cyclic ether compounds such as ethylene oxide (EO), propylene oxide (PO), butylene oxide, and tetrahydrofuran can be given. Specific examples include EO-modified trimethylolpropane, PO-modified trimethylolpropane, tetrahydrofuran-modified trimethylolpropane, EO-modified glycerol, PO-modified glycerol, tetrahydrofuran-modified glycerol, EO-modified pentaerythritol, PO-modified pentaerythritol, tetrahydrofuran-modified pentaerythritol, EO-modified sorbitol, PO-modified sorbitol, EO-modified sucrose, PO-modified sucrose, EO-modified sucrose, EO-modified quadrol and the like. Of these, EO-modified trimethylolpropane, PO-modified trimethylolpropane, PO-modified glycerol, PO-modified sorbitol are preferred.

The molecular weight of the polyether polyol is preferably 100–2,000, and more preferably 160–1,000. If the molecular weight of the polyether polyol is too small, form stability and physical stability of three-dimensional objects formed from the resin composition may be insufficient. On the other hand, if the molecular weight of the polyether polyol is too large, increased viscosity of the resin composition may give rise to lower modulus of elasticity of the three-dimensional objects formed by photofabrication.

As examples of commercially available products of polyether polyols, Sunnix TP-400, GP-600, GP-1000, SP-750, GP-250, GP-400, GP-600 (manufactured by Sanyo Chemical Industries, Ltd.), TMP-3 Glycol, PNT-4 Glycol, EDA-P-4, EDA-P-8 (manufactured by Nippon Nyukazai Co., Ltd.), G-300, G-400, G-700, T-400, EDP-450, SP-600, SC-800 (manufactured by Asahi Denka Kogyo Co., Ltd.), and the like can be given.

These polyether polyols can be used either individually or in combinations of two or more.

The proportion of the polyol used in the photocurable resin composition of the present invention is usually, relative to the total composition, 5–35 wt %, preferably 7–30 wt %, and more preferably 10–25 wt %.

Description of Calculation Method and Test Methods
Calculation of Boltzmann Averaged Dipole Moment The Boltzmann averaged dipole moment is calculated in the following way. First, for the acrylate under consideration a set of starting configurations is generated by considering all possible bond rotations. This is done by means of the Discover 95 program (Computational results obtained using software programs from Molecular Simulations—force field calculations were done with the Discover® program, using the CVFF forcefield, semi-empirical calculations were done the MOPAC 6.0 program).

Torsional angles considered depend on the type of bond, e.g. for a bond between two $sp^3$ carbons the angles taken into account are those corresponding to the two possible gauche conformations and the trans conformation. The number of configurations generated is thus dependent on both the number of bonds and their type. E.g. for three $sp^3$ like bonds one has $3^5=243$ configurations. As a consequence, for some of the acrylates, the total number of configurations was a few thousand.

All these configurations are then minimized at the AM1 level using MOPAC 6.0 with the convergence criterion for the maximum gradient (GNORM) set to 0.05. The resulting structures are then sorted by energy and only the unique structures having a heat of formation differing less than 3 kcal/mole from the heat of formation of the global minimum structure are retained. Whether or not structures are unique is determined by comparing their heats of formation and their dipole moments in the following way. First, structures are considered to be identical if their heats of formation differ at most 0.01 kcal/mole. Nevertheless, structures which are considered to be identical based on this energy criterion are considered to be unique if their dipole moments differ more than 0.2 Debye.

Having determined the unique structures, the Boltzmann weighted dipole moment is consequently evaluated as given by formula (18):

$$<D> = \sum_j D_j \frac{e^{-\Delta H_j/RT}}{\sum_i e^{-\Delta H_i/RT}} = \sum_j D_j p_j \quad (18)$$

with $D_j$ the dipole moment of conformation j, $\Delta H_j$ the difference between the heat of formation of conformation j and the heat of formation of the global minimum conformation, T the absolute temperature and R the Boltzmann constant, $p_j$ is the probability of finding the molecule in conformation j at the temperature T. T is set to 298.15 K. The summation over j runs over all unique structures. Sorting of structures, retaining only the unique ones and the calculation of <D> is done by means of a FORTRAN program developed in.

The advantage of considering the Boltzmann weighted dipole moment instead of the dipole moment of the global minimum structure is that the former takes into account the fact that several conformations can be accessible at T. It is obvious that when the dipole moments of the accessible conformations are significantly different, the value of <D> may be significantly different from the dipole moment of the global minimum. The Boltzmann weighted dipole moment therefore provides a much more realistic description of the system.

RT FTIR Measurements

A 10 micron thick layer of the reactive composition on a gold coated Alumina plate was cured in a RT-FTIR instrument under a nitrogen atmosphere (Bruker IFS 55 equiped with a transflection cell and a UV source, an Oriel system with a 200W Hg lamp, for a full description of the equipment see: A. A. Dias, H. Hartwig, J.F.G.A. Jansen conference proceedings PRA Radcure coating and inks; curing and performance June 1998 paper 15). The consumption of acrylate bonds was measured at 21° C. during the curing by this technique and the maximum rates of acrylate conversions (in mol/l sec) were calculated according to the above cited reference.

Determination of Dielectric Constants

The determination of the dielectric constant was performed according to ASTM D150 employing a Novocontrol Alpha analyzer, using a liquid measuring cel with a gap of 4.86 mm and a diameter of 20.7 mm. The measurements were performed at 23° C. The dielectric constants at 10 KHz are given.

Method for Calculating the Volumetric Thermal Expansion Coefficient

The thermal expansion coefficient $\alpha_{23}$ for several coating systems can be predicted on the basis of chemical structural information by using commercial software packages: the module Synthia of MSI (Molecular Simulations Inc, San Diego, Calif.) in combination with the Builder module of MSI. Synthia version 8.0 and the standard Builder module within the Insight II (4.0.0P) graphical environment were used. The computations were performed on a Silicon Graphics O2 workstation under a Unix based operating system. The builder module is applied for the construction of the chemical monomer species that will serve as input for the Synthia module. This module Synthia is based on a methodology developed by J. Bicerano that is explained in detail in his monograph (J. Bicerano, *Prediction of polymer* properties, Marcel Dekker Inc., New York, 1993). This methodology makes use of compositional information, i.e. the chemical monomer structure, for the prediction of polymer properties. In particular, connectivity indices based on graph theory are used. This methodology is developed for the prediction of properties, among these properties the thermal expansion coefficient, of linear amorphous homopolymers and for linear alternating and random amorphous copolymers. The term linear refers to non-crosslinked systems. The primary coatings according to the present invention may be treated as linear copolymers because their thermal expansion coefficient depends on the cohesive energy density, and thus most significantly on the polarity and not on the network characteristics of the coatings. The polarity is identical for a network system or it's linear analogue. So, this linear analogue, a linear statistical copolymer is constructed based on the chemical recipe of the coatings. The software program calculates the thermal expansion coefficient at 23° C. ($\alpha_{23}$).

Experimental Section

EXAMPLES 1–6 AND COMPARATIVE EXPERIMENTS A–O

Boltzmann average dipole moments of functional groups which have been attached to an acrylate group have been calculated. Examples 1–6 show functional groups, attached to an acrylate group, falling under the invention. Comparative experiments A–O show acrylates which are known in the art, which show a low Boltzmann average dipole moment and do not fall under the present invention.

Cure speeds of the monomers of examples 1–6 and comparative experiments have been measured; 1% Irgacure 184 (w/w) was dissolved in the monomer and the cure was monitored by RT-FTIR. The RT-FTIR measurement of Example 5 was carried out at 50° C., because the monomer of Example 5 is a solid at room temperature.

| Example | Structure | dipole AM1 (Debye | rate (mol/l sec) |
|---|---|---|---|
| 1 | | 3.87 | 17.9 |
| 2 | | 4.12 | 17.9 |
| 3 | | 4.54 | 17.55 |
| 4 | | 6.5 | 33 |
| 5 | | 7.38 | 38 (at 50° C.) |
| 6 | | 4.62 | 25.2 |

Comparative experiments:
Calculated Boltzman average Dipole moments (3.5 Debye and lower) and rates of pure monomers are given.

| Comparative Experiment | Structure | dipole AM1 (Debye) | rate (mol/l sec) |
|---|---|---|---|
| A | 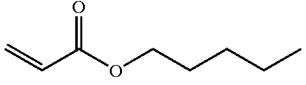 | 1.8 | 2.2 |
| B | 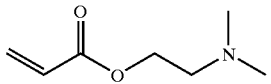 | 2.01 | 1.04 |
| C | 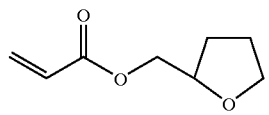 | 2.05 | 5.3 |
| D | 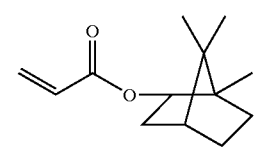 | 2.08 | 5.83 |
| E | 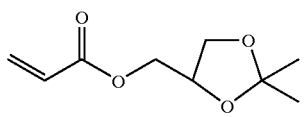 | 2.17 | 7 |
| F | 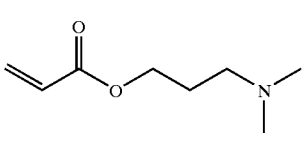 | 2.20 | 0.88 |
| G | 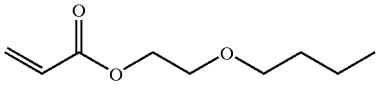 | 2.24 | 2.1 |
| H | 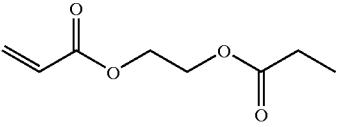 | 2.40 | 3.95 |
| I | 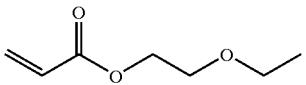 | 2.42 | 2.67 |
| J | 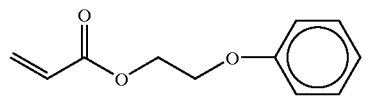 | 2.49 | 4.12 |
| K | 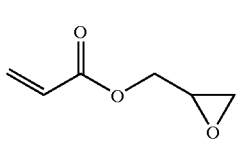 | 2.59 | 4.11 |
| L | 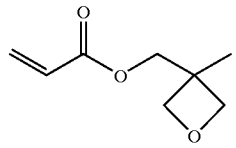 | 2.65 | 8.2 |

-continued

| Comparative Experiment | Structure | dipole AM1 (Debye) | rate (mol/l sec) |
|---|---|---|---|
| M | acrylate-O-CH2CH2-OH | 2.93 | 14 |
| N | acrylate-O-CH2CH2-O-CH2CH2-O-CH3 | 2.95 | 2.7 |
| O | acrylate-O-CH2CH2-O-C(=O)-O-ethyl | 3.30 | 4.79 |

These results clearly indicate that generally available monomers with low dipole moments do not show very high polymerization rates. Much higher rates of polymerization are obtained employing monomers with higher dipole (examples 1–6).

Moreover comparison of example 3 with example 6 shows two monomers that have a comparable high dipole moment. The rate of polymerization of the monomer of example 6 is even higher than the rate of polymerization of the monomer of example 3. This difference is due to the ability of formation of H-bonds of the monomer of example 6, which gives an additional increase of the rate of polymerization.

EXAMPLE 7

1% Irgacure 184 was dissolved in a mixture of oxazolidone acrylate (a monomer with a high calculated dipole moment of D=5.3) and tetrahydrofurfuryl acrylate (a monomer with a low calculated dipole moment of D=2.05). The ratio of the two monomers has been changed in the series of experiments, thereby changing the calculated dipole moment of the mixture of the two monomers and the dielectric constant of the composition. The rates of polymerization were determined with the aid of RT-FTIR. The results are shown in the next table This example 7 clearly shows the surprising effect of an increase of the rate of polymerization when using an increasing amount of monomers having a high dipole moment.

EXAMPLE 8

Example 8 shows the effect of the use of a nonreactive diluent (propylene carbonate, having a high calculated dipole moment of D=5) on the rate of polymerization;

1% Irgacure 184 was dissolved in a mixture of propylene carbonate (D=5) and tetrahydrofurfuryl acrylate (a monomer having a low calculated dipole moment of D=2.05). The rates were determined with RT-FTIR using a transmissision setup between two NaCl plates. Due to this change in setup the light intensity was reduced resulting in a lower maximum rate of polymerization for tetrahydrofurfuryl acrylate. The results are shown in the next table.

| Amount propylene carbonate (% w/w) | Dipole (debye) | Rate (mol/l sec) |
|---|---|---|
| 0 | 2.05 | 3.17 |
| 10 | 2.48 | 3.62 |
| 20 | 2.86 | 4.26 |
| 30 | 3.21 | 4.77 |

This example shows that addition of a nonreactive compound having a high dipole moment also enhances the rate of polymerization.

| mixture (%) | | | |
|---|---|---|---|
| tetrahydrofurfuryl acrylate | oxazolidone acrylate | Dipole (Debye) | rate (mol/l sec) |
| 100 | 0 | 2.05 | 5.3 |
| 90 | 10 | 2.35 | 5.79 |
| 80 | 20 | 2.66 | 7.46 |
| 70 | 30 | 2.97 | 9.75 |
| 60 | 40 | 3.28 | 12.52 |
| 30 | 70 | 4.27 | 17.23 |
| 20 | 80 | 4.61 | 20.63 |
| 10 | 90 | 4.95 | 22.72 |
| 0 | 100 | 5.3 | 27.29 |

EXAMPLES 9–18 AND COMPARATIVE EXPERIMENTS P–R

A number of urethane acrylates have been prepared, having functional groups having high calculated dipole moments.

The synthesis of these compounds has been performed as follows:

Under stirring 1 eq of an hydroxy functional acrylate was added to a mixture of 1 eq of a diisocyanate containing 0.05% dibutyltin dilaurate whilst dry air was bubbled through the mixture at such a rate that the temperature did not rise above 35° C.

After complete addition of the hydroxy functional acrylate 1 eq of a hydroxy group containing compound having a functional group having a high dipole moment was added at once after which the temperature was raised to 80° C. and kept at that temperature for an additional 2 hours.

These samples were mixed with hydroxy ethyl acrylate (HEA) (50% w/w) and 1% Irgacure 184 after which the RT-FTIR profile was recorded. The results are shown in the following tables:

| Example | Acrylate | Diisocyanate | Alcohol | dipole moment of alcohol (Debye) | Rate (mol/l sec) |
|---|---|---|---|---|---|
| 9 | HEA | IPDI | (structure) | 5.64 | 29 |
| 10 | HEA | IPDI | (structure) | 4.75 | 30 |
| 11 | HEA | IPDI | (structure) | 4.18 | 37 |
| 12 | HEA | IPDI | (structure) | 4.07 | 32 |
| 13 | HEA | IPDI | (structure) | 3.17 | 30 |
| 14 | HEA | IPDI | (structure) | 3.13 | 31 |
| 15 | HPA | IPDI | (structure) | 4.18 | 34 |
| 16 | HBA | IPDI | (structure) | 4.18 | 27 |
| 17 | HEA | TDI | (structure) | 4.18 | 35 |
| 18 | HEA | HDI | (structure) | 4.18 | 30 |

Comparative experiment

| Comparative experiment | Acrylate | diisocyanate | Alcohol | Dipole moment of alcohol (Debye) | Rate (mol/l sec) |
|---|---|---|---|---|---|
| P | HEA | IPDI | HO-CH₂CH₂-O-C₆H₅ | 1.65 | 19 |
| Q | HEA | IPDI | HO-CH₂-cyclohexyl | 1.69 | 20 |
| R | HEA | IPDI | HO-CH₂CH₂-O-CH₃ | 1.96 | 17 |

Abbreviations:
HEA = hydroxy ethyl acrylate,
HPA = 2-hydroxy propyl acrylate,
HBA = 4-hydroxy butyl acrylate,
IPDI = isophorone diisocyanate,
TDI = toluene diisocyanate,
HDI = hexane diisocyanate These examples and the comparative experiments clearly show that (meth)acrylate functional urethanes from alcohols with dipole moments >2.5 possess higher rates of polymerization compared to functional urethanes of alcohols with dipoles lower than 2.

EXAMPLES 19–22 AND COMPARATIVE EXPERIMENT S

A number of radiation curable optical fiber coating compositions has been prepared containing a radiation curable oligomer (A) and at least one reactive diluent (B). The coating compositions can be used as primary coating compositions, and ultimately as secondary coating compositions.

The synthesis of the oligomer has been performed in accordance with the synthesis of oligomer 1 of Example II of U.S. Pat. No. 5,219,896. The oligomer is an aliphatic polyether-polycarbonate based urethane acrylate.

The oligomer was mixed with other ingredients to form radiation curable optical fiber coating compositions as indicated in the following table. The dielectric constants were measured and the RT-FTIR profiles were recorded:

| % w/w | Ex. 19 | Ex. 20 | Ex. 21 | Ex. 22 | Comp. Exp. S |
|---|---|---|---|---|---|
| Oligomer | 52 | 52 | 52 | 52 | 52 |
| SR504 | 32 | 32 | 32 | 32 | 32 |
| IDA | | | | | 11.5 |
| Monomer of Ex. 11 (D of alcohol = 4.18) | 11.5 | | | | |
| Monomer of Ex. 3 (D = 4.54) | | 11.5 | | | |
| Monomer of Ex. 4 (D = 6.5) | | | 11.5 | | |
| 5-ring cyclic carbonate ester acrylate | | | | 11.5 | |
| Lucirin TPO | 3 | 3 | 3 | 3 | 3 |
| Irganox 1035 | 0.5 | 0.5 | 0.5 | 0.5 | 0.5 |
| Silane A189 | 0.25 | 0.25 | 0.25 | 0.25 | 0.25 |
| Silane Z6040 | 0.25 | 0.25 | 0.25 | 0.25 | 0.25 |
| Tinuvin 292 | 0.5 | 0.5 | 0.5 | 0.5 | 0.5 |
| Dielectric constant at 10 kHz | 7.22 | 8.13 | 8.64 | 9.15 | 6.12 |
| Rate (mol/l sec) | 3.53 | 3.88 | 4.17 | 4.40 | 2.67 |

Abbreviations and tradenames:
SR504 = ethoxylated (n = 4) nonyl phenol acrylate,
IDA = isodecyl acrylate,
Lucerin TPO = 2,4,6-trimethylbenzoyl diphenyl phosphine oxide (BASF),
Irganox 1035 = thiodiethylene bis-(3,5-di-tertiary-butyl-4-hydroxy) hydrocinnamate (antioxidant),
A-189 = 1-propanethiol,3-(trimethoxysilyl) adhesion promoter,
Z6040 = a silane adhesion promoter,
Tinuvin 292 = UV-absorber,
5-ring cyclic carbonate ester acrylate = 2-oxo-1,3-dioxolan-4-yl-methyl acrylate according to formula (19)

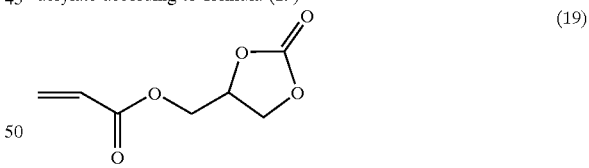

(19)

These examples and comparative experiments clearly show that the maximum rate of polymerization increases upon increasing the dielectric constant of the primary coating composition.

EXAMPLE 23 AND COMPARATIVE EXPERIMENT T (SECONDARY COATING COMPOSITION)

Oligomer T is an aromatic polyether based urethane acrylate oligomer having a Mw of 1000, which is derived from 2-hydroxyethylacrylate, toluene diisocyanate, and a polyether diol.

| | Comparative Experiment T Secondary coating composition Wt. % |
|---|---|
| Components | |
| Oligomer T | 34.17 |
| Ethoxylated (n = 3) bisphenol A diacrylate | 56 |
| Ethoxylated (n = 4) nonyl phenol acrylate | 6.09 |
| Photoinitiators | |
| Lucerin TPO | 1.07 |
| Irgacure 184 | 2.14 |
| Irganox 1035 | 0.53 |
| Properties | |
| Dielectric constant at 10 kHz at 23° C. | 6.94 |

Example 23 is a secondary coating composition comparable to Comparative Experiment T wherein the 6.09 wt % of ethoxylated (n=4) nonylphenol acrylate has been replaced by 6.09 wt % of the monomer of Example 4 (having a dipole moment D=6.5 Debye). The dielectric constant at 10 kHz at 23° C. of the secondary coating of example 23 is 7.78.

EXAMPLE 24 AND COMPARATIVE EXPERIMENT U (MATRIX COMPOSITION)

The matrix composition of Comparative Experiment U contains 40 wt. % of an oligomer U which is an aromatic polyether based urethane acrylate oligomer, derived from 2-hydroxyethylacrylate, toluene diisocyanate, and a polytetramethylene glycol having Mn Of 1000, 30 wt. % ethoxylated (n=3) bisphenol A diacrylate, 8 wt % hexane diol diacrylate and 10 wt % isobornyl acrylate. The composition has a dielectric constant at 10 kHz at 23° C. of 8.68.

Example 24 is a matrix composition similar to Comparative Experiment U, but wherein isobornyl acrylate has been replaced by 10 wt. % of the monomer of Example 4 (having a dipole moment D=6.5 Debye). The dielectric constant at 10 kHz at 23° C. of the matrix composition of example 24 is 9.37.

EXAMPLE 25 AND COMPARATIVE EXPERIMENT V (CLEAR FOR INK COMPOSITION)

The clear composition of Comparative experiment V contains 21 wt. % of an oligomer V which is Ebecryl 264 (an 85% aliphatic urethane triacrylate oligomer/15% hexane diol diacrylate monomer blend, theoretical Mw of 2000), 32 wt. % of ethoxylated (n=3) bisphenol A diacrylate, 16 wt. % of penta erythrithol tetra acrylate and 7 wt. % of isobornyl acrylate. The composition has a dielectric constant at 10 kHz at 23° C. of 8.19.

Example 25 is a clear composition similar to Comparative Experiment V, but wherein isobornyl acrylate has been replaced by 7 wt. % of the monomer of Example 4 (having a dipole moment D=6.5 Debye). The dielectric constant at 10 kHz at 23° C. of the clear composition of example 25 is 9.11.

EXAMPLE 26

A secondary coating composition was formulated using 50 wt. % of an aliphatic polyether based urethane acrylate oligomer (the oligomer is derived from 2-hydroxyethylacrylate, isophorone diisocyanate, and polytetrahydrofuran having Mn of 1000), 32.8 wt. % of 2-hydroxyethylacrylate, 17.2 wt. % of HEA-IPDI-5CC adduct (as described for coating U in Table 1 above) and 1 wt. % of Irgacure 184.

The calculated $\alpha_{23}$ is $6.42 \times 10^{-4}$ $K^{-1}$, the rate of polymerization is 2.99 mol/l sec.

EXAMPLE 27

A secondary coating composition was formulated using 50 wt. % of an aliphatic polyether based urethane acrylate oligomer (the oligomer is derived from 2-hydroxyethylacrylate, isophorone diisocyanate, and polytetrahydrofuran having Mn of 1000), 32.8 wt. % of 2-hydroxyethylacrylate, 17.2 wt. % of ethoxylated (n=4) nonyl phenol acrylate and 1 wt. % of Irgacure 184.

The calculated $\alpha_{23}$ is $6.71 \times 10^{-4}$ $K^{-1}$. The rate of polymerization is 2.67 mol/l sec.

What is claimed is:

1. A radiation curable composition, wherein one or more components are present that are chosen from the group consisting of compounds (C1) according to the formula (1):

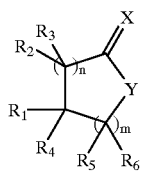

(1)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P; X is an oxygen or sulfur atom; Y is an oxygen or sulfur atom or an $NR_7$-group; n is 0–4; m is 0–4 and n+m=1–4;

or compounds (C2) according to formula (2):

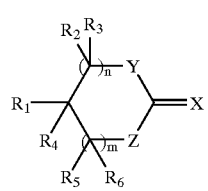

(2)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 0–4; m is 0–4 and n+m=2–4, or compounds (C3) according to the formula (3):

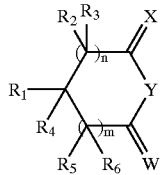

(3)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X and W are independently an oxygen or sulfur atom; Y is an oxygen or sulfur atom or an $NR_7$-group; n is 0–4; m is 0–4 and n+m=1–4;

or a compound (C4) according to the formula (4):

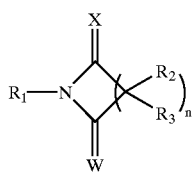

(4)

wherein $R_1$=organic group with a molecular weight between 40 and 20000; $R_2$, and $R_3$, are independently of each other H, an alkyl group having 1–20 C atoms, wherein the alkyl group can be linear, branched or cyclic and may contain heteroatoms like =N, O, S and P or an aryl group having from 6–20 C-atoms; X and W are independently an oxygen or sulfur atom; n is 1–4;

or a compound (C5) according to the formula (5):

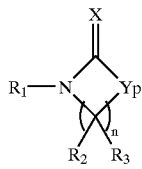

(5)

wherein $R_1$=organic group with a molecular weight between 40 and 20000; $R_2$, and $R_3$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y is an oxygen or sulfur atom or an $NR_7$-group; n is 1–5; p=0, 1; but excluding a compound wherein $R_1$=$CH_2CHCO_2CH_2CH_2$ or R1=$CH_2CCH_3CO_2CH_2CH_2$ with n=2, 3 and X=Y=oxygen, or a compound (C6) according to the formula (6):

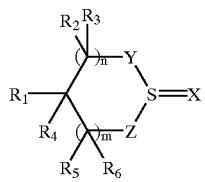

(6)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 0–4; m is 0–4 and n+m=1–4, or a compound (C7) according to the formula (7):

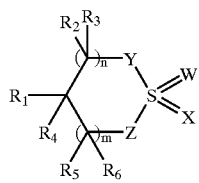

(7)

wherein $R_1$=organic group with a molecular weight between 40 and 20000; $R_2$, $R_3$, $R_4$, $R_5$, $R_6$ and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; W, X, Y and Z are independently an oxygen or sulfur atom or an $NR_7$-group with the proviso that W and X are not both an $NR_7$-group at the same time; n is 1–4;

or a compound (C8) according to the formula (8):

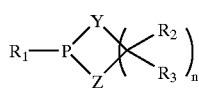

(8)

wherein $R_1$=organic group with a molecular weight between 40 and 20000; $R_2$, $R_3$, and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y and Z are independently an oxygen or sulfur atom or an $NR_7$-group; n is 1–4;

or a compound (C9) according to the formula (9):

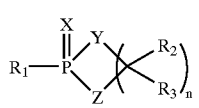

(9)

wherein $R_1$=organic group with a molecular weight between 40 and 20000; $R_2$, $R_3$, and $R_7$ are independently of each other H, an alkyl group having 1–20 C atoms, wherein the alkyl group can be linear, branched or cyclic and may contain heteroatoms like =N, O, S and P or an aryl group having from 6–20 C-atoms; X is an oxygen or sulfur atom; Y is an oxygen or sulfur atom or an $NR_7$-group; n is 1–4.

2. The radiation curable composition of claim 1, wherein the components further comprise A a radiation curable oligomer (A) and B a diluent (B).

3. The radiation curable composition of claim 2, wherein the diluent (B) is a reactive diluent (B).

4. The radiation curable composition according of claim 1, wherein the functional group, when attached to an acrylate group, has a Boltzmann average dipole moment of higher than 4.5 Debye.

5. The radiation curable composition according to claim 1, wherein at least one of the $R_1$ to $R_7$ groups contains a radiation curable functional group.

11. The radiation curable composition according to claim 1, wherein a radiation curable diluent is present, which is a compound according to the formula (11):

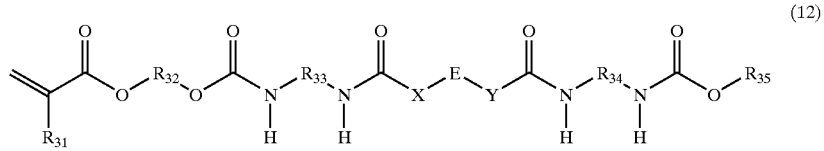

(11)

wherein $R_{21}$=H or Me, $R_{22}$=organic group having 1–20 C-atoms, $R_{23}$=organic group having 1–20 C atoms and $R_{24}$ is a heterocyclic group of which the corresponding alcohol has a calculated Boltzmann average dipole moment of >2.5 Debye.

12. The radiation curable composition according to claim 1, wherein a radiation curable component is present according to the formula (12):

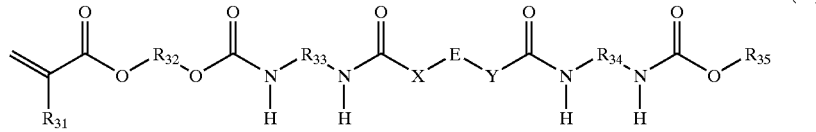

(12)

6. The radiation curable composition according to claim 2, wherein the radiation curable oligomer (A) or diluent (B) comprises a NH- or OH-group.

7. The radiation curable composition according to claim 1, wherein the component that contains a functional group also has a radiation curable functional group selected from the group consisting of methacrylate, acrylate, vinylether, fumarate, maleate, itaconate, oxolane or epoxy group.

8. The radiation curable composition according to claim 1, wherein the component that contains a functional group also has a radiation curable functional group selected from the group consisting of methacrylate, acrylate, vinylether, fumarate, maleate, itaconate, oxolane or epoxy group.

9. The radiation curable composition according to claim 8, wherein the radiation curable functional group is a methacrylate or an acrylate group.

10. The radiation curable composition according to claim 1, wherein a radiation curable diluent is present, which is a compound according to the formula (10):

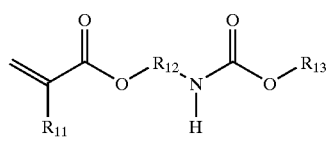

(10)

wherein $R_{11}$=H or Me, $R_{12}$=organic group having 1–20 C-atoms and $R_{13}$ is a heterocyclic group of which the corresponding alcohol has a calculated Boltzmann average dipole moment of >2.5 Debye.

wherein $R_{31}$=H or Me, $R_{32}$, $R_{33}$ and $R_{34}$=are independently an organic group having 1–20 C atoms, E is an oligomer or polymer with a molecular weight between 100 and 100000, X and Y are independently oxygen, sulfur or a $NR_7$-group, and $R_{35}$ is a heterocyclic group of which the corresponding alcohol has a calculated Boltzmann average dipole moment of >2.5 Debye.

13. The radiation curable composition according to claim 12, wherein E has a molecular weight between 500 and 10000.

14. The radiation curable composition according to claim 1, wherein the component that contains a functional group which, when attached to an acrylate group, has a calculated Boltzmann average dipole moment of greater than 3.5 Debye or the component containing a heterocyclic group of which the corresponding alcohol has a calculated Boltzmann average dipole moment of greater than 2.5 Debye is present in an amount of at least about 3 wt. % relative to the total amount of components in the composition.

15. The radiation curable composition of claim 14, wherein the component that contains a functional group or the component that contains a heterocyclic group is present in an amount of at least about 5 wt. % relative to the total amount of components in the composition.

16. The radiation curable composition as defined in claim 1, wherein said composition is a coating composition, an adhesive composition, or an ink composition.

17. The radiation curable composition as defined in claim 1, wherein said composition is a glass fiber coating composition.

18. The composition of claim 1, wherein said composition comprises a component according to said formula (2).

19. The composition of claim 18, wherein Y represents an oxygen atom and wherein Z represents an $NR_7$-group.

20. A composition comprising the following component:
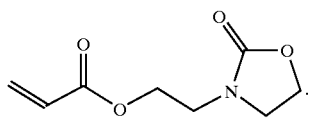
21. The composition of claim 1, wherein said composition is a stereolithography composition.
22. The composition of claim 18, wherein the n+m in formula (2) equals 1, and Y represents an oxygen atom and Z represents an $NR_7$-group.
* * * * *